United States Patent [19]
Wohlrab

[11] Patent Number: 5,802,135
[45] Date of Patent: Sep. 1, 1998

[54] ARITHMETIC UNIT FOR A COMPUTED TOMOGRAPHY APPARATUS

[75] Inventor: Juergen Wohlrab, Forchheim, Germany

[73] Assignee: Siemens Aktiengesellschaft, Munich, Germany

[21] Appl. No.: 840,885

[22] Filed: Apr. 17, 1997

[30] Foreign Application Priority Data

Apr. 23, 1996 [DE] Germany .................. 196 16 199.1

[51] Int. Cl.$^6$ ...................................................... A61B 6/03
[52] U.S. Cl. ............................. 378/4; 378/901; 382/131
[58] Field of Search ......................... 378/4, 901; 382/131

[56] References Cited

U.S. PATENT DOCUMENTS 4,463,375  7/1984  Macovski ...................... 378/98.12
5,703,920  12/1997 Wohlrab et al. ..................... 378/4

Primary Examiner—David P. Porta
Assistant Examiner—David Vernon Bruce
Attorney, Agent, or Firm—Hill & Simpson

[57] ABSTRACT

An arithmetic unit for a computed tomography apparatus has special hardware in the form of a processor, a median filter ASIC, an angle clipping ASIC and two memories are employed. In the median filter ASIC, for each pixel a determination of increments for generating a supporting point address are made by the processor, the access addresses are calculated and the supporting points are addressed from a first of the memories and a median value formation is undertaken in the median filter ASIC, followed by a difference image production in the median filter ASIC. In the angle clipping ASIC, a determination is made of the coordinates of each pixel with reference to a rotational center in the processor, and supporting points are generated and accumulated from the difference image resulting from the median filtering, and a resultant image is generated in the angle clipping ASIC.

3 Claims, 5 Drawing Sheets 5,802,135

1

ARITHMETIC UNIT FOR A COMPUTED TOMOGRAPHY APPARATUS

BACKGROUND OF THE INVENTION

1. Field of the Invention

The present invention is directed to an arithmetic unit for use in computer tomography apparatus for assisting in the reconstruction of an image, with artifact reduction, of an examination subject.

2. Description of the Prior Art

In computed tomography, ring artifacts can occur in the reconstructed images given an apparatus with a rotating x-radiator detector system. An algorithm can be applied that suppresses the ring artifacts in the form of an image after-processing. This algorithm is referred to below as an adaptive filter.

SUMMARY OF THE INVENTION

An object of the present invention is to efficiently implement adaptive filter in a computed tomography apparatus for artifact reduction.

In the inventive arithmetic unit for a computed tomography apparatus, a special hardware in the form of a processor, a median filter ASIC, an angle clipping ASIC and two memories are employed. In the median filter ASIC, for each pixel a determination of increments for generating a supporting point address are made by the processor, the access addresses are calculated and the supporting points are addressed from a first of the memories and a median value formation is undertaken in the median filter ASIC, followed by a difference image production in the median filter ASIC. In the angle clipping ASIC, a determination is made of the coordinates of each pixel with reference to a rotational center in the processor, and supporting points are generated and accumulated from the difference image resulting from the median filtering, and a resultant image is generated in the angle clipping ASIC.

DESCRIPTION OF THE PREFERRED EMBODIMENTS

Figure 1:
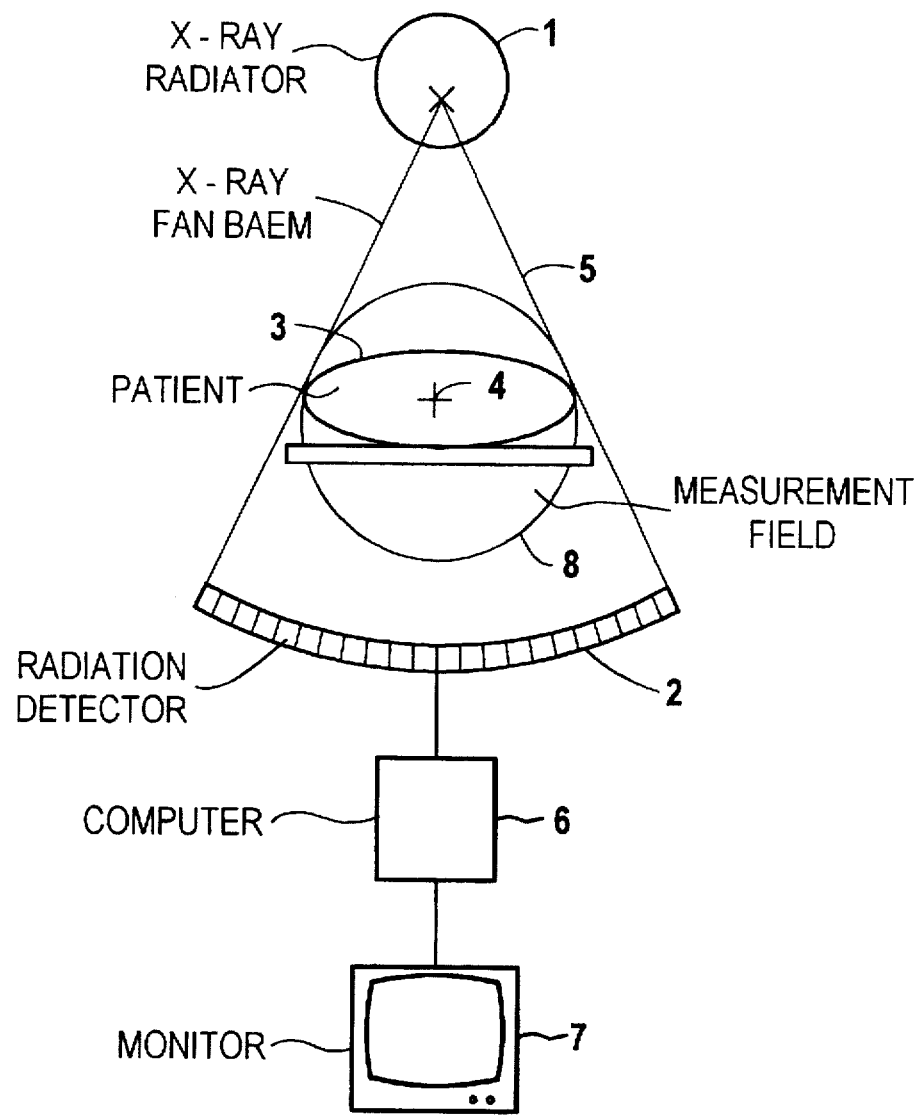
FIG. 1 is a schematic illustration showing the basic components of a computed tomography apparatus with fan beam for explaining the invention.

FIG. 1 shows a computed tomography apparatus having an x-ray radiator 1 and a detector 2 composed of a matrix of detector elements. The x-ray radiator 1 and the detector 2 rotate around a system axis 4 for scanning an object 3, so that the object 3 is transirradiated from different directions by the fan-shaped x-ray beam 5 emanating from the x-ray radiator 1. The data supplied by the detector elements of the detector 3 are supplied to a computer 6 that reconstructs tomograms within the transirradiated volume of the object 3, that are reproduced on a monitor 7. The subject 3 lies in a measurement field 8 covered by the x-ray beam 5.

The special hardware described below uses the maximum access bandwidth to the data memory DAT completely and thus represents an optimum arithmetic unit for an adaptive filter in the computer 6. In a conventional multiprocessor system, the maximum access bandwidth to the data memory cannot be totally utilized due to arbitration losses in the arbiter operation.

2

The basic calculating steps of the inventive adaptive filter are:

A) Cutting off bones and air: limitation of all pixel values of an input image INV to a prescribable upper and lower threshold. This calculating step yields a new image matrix KLB.

B) A first median filtering of the entire matrix KLB on a straight line in the direction from the respective pixel to a prescribable rotational center Z (xc, yc). Let the raster of the M1 supporting points on this straight line be prescribable with image-specific parameters. The pixel values that are thus obtained are subtracted from the pixels of the matrix KLB, and the difference is subjected to a threshold evaluation with a prescribable threshold SART. A new difference image matrix UDB' is thus updated.

C) A second median filtering of a sub-matrix of the difference of the matrices KLB and UDB' close to the rotational center on a straight line in the direction from the respective pixel to the rotational center Z (xc, yc). Let the raster of the M to supporting points on this straight line be prescribable by image-specific parameters. The pixel values thus obtained are subtracted from the pixels of the matrix KLB and this difference is subjected to a threshold evaluation with a prescribable threshold SART. A new sub-matrix UDB" is thus obtained. The sub-matrix UD" is copied into the matrix UDB'. The uncut difference image matrix UDB is thus obtained.

D) Angle clipping or azimuthal smoothing: averaging over W supporting points of the matrix UDB on an arch proceeding in both directions around the rotational center Z from the respective pixel. Dependent on the distance from the rotational center, the pixels are divided into pixels in the inside region (flag WIAU=0) and pixels in the outside region (flag WIAU=1). The angular increment between the supporting points differs in the inside and outside region.

E) Resultant image generation: the angle-clipped difference image pixels that derive from step D are subtracted from the image input matrix INB and the pixel values that are obtained are limited to the region [0.4095]. The result image OUTB is thus obtained.

Figure 2:
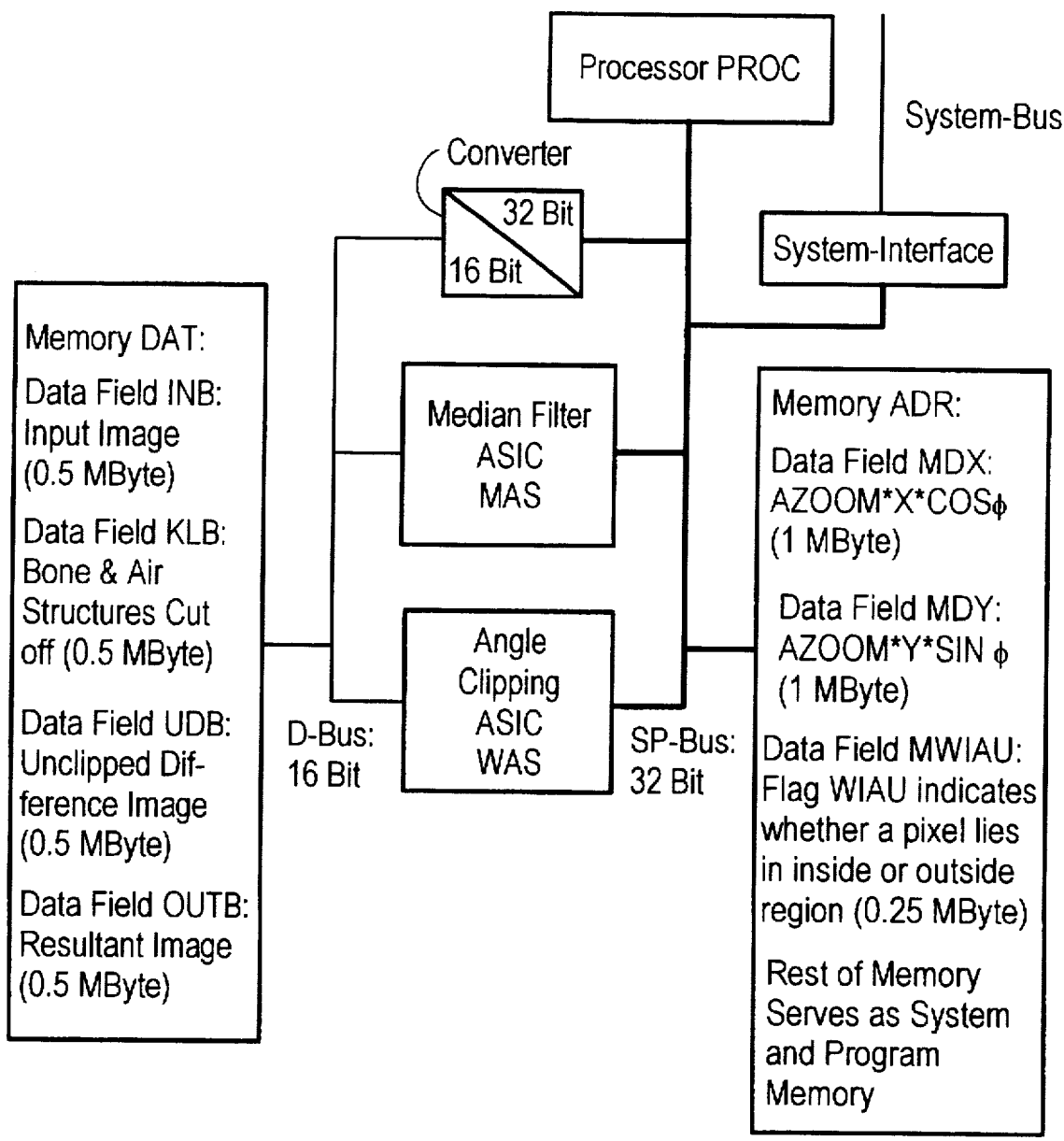
FIGS. 2–6 are graphic illustrations for explaining the details of the invention.

The minimum expansion level of the disclosed special hardware is shown in FIG. 2. It is composed of a processor PROC, a median filter ASIC MAS, an angle clipping stage ASIC WAS and two memories DAT and ADR.

The data format of the matrices in the data memory DAT is 16 bit integer. The address calculations are implemented in floating decimal point and the results are rounded to data format integer.

The steps A, B and C are conducted in the median filter ASIC MAS.

The steps D and E are conducted in the angle clipping ASIC WAS. The ASICs MAS and WAS should be parameterized, driven and monitored by the processor PROC. The processor PROC also represents an intelligent, programmable connection to the system bus that interfaces to the dedicated computed tomography apparatus.

For supporting the two ASICs, the processor PROC should handle the following calculations whose results can be accessed by the ASICs via the SP-bus. For each pixel, the direction from the pixel to the rotational center must be calculated in the form of an x-component DX and a y-component DY. The flag WIAU that indicates whether the pixel lies on the inside or on the outside region must likewise be determined for each pixel. Among other things, the operation 1/SQURT(x) that should not alter the format of the ASICs, is necessary for these calculations. These calculations are carried out by the processor PROC with a slight time advance parallel to the processing conducted by the median filter ASIC MAS. The processing capacity of the median filter ASICs MAS is adapted to the processing capacity of the processor PROC so that the values DX and DY of a pixel calculated by the processor PROC are already available when processing that pixel in the median filter ASIC MAS.

The values DX calculated by the processor PROC are deposited in the matrix MDX, the values DY are deposited in the matrix MDY and the values WIAU are deposited in the matrix MWIAU.

The ASICs MAS and WAS increment accesses onto the data fields in the memory DAT via a 16-bit bus D. Via a converter (see FIG. 2), the processor PROC is able to access the memory DAT via the bus D by DMA in order to carry out the following tasks:

a) Writing the input image before the start of the calculations;

b) Reading the resultant image after the end of the calculations; and c) Debugging if an error has occurred during the calculations.

The use of a second bus D in addition to the bus SP to which the processor PROC is connected yields the following advantages:

a) Access of the processor PROC when writing the matrices MDX, MBY and MWIAU does not disturb the access of the median filter ASIC MAS onto the data fields in the memory DAT;

b) Parallel access onto the matrices MDX/MDY in the memory ADR and KLB/UDB in the memory DAT possible given the median filter; and c) No arbitration loses when accessing the memory DAT via the bus D. The ASICs MAS and WAS cannot competitively access the memory in terms of the execution of the algorithm. Due to the unpredictable access time of the processor PROC, an arbitration logic that causes a longer access time on the bus SP is required at the bus SP to which the processor PROC is connected.

No separate data fields are reserved for the matrices UDB' and UDB". The resultant matrix UDB' of the first median filter is deposited in the data field UDB. For processing in the second median filter, the matrices KLB and UDB' are required as input data (UDB' cannot be destroyed until it is copied at the end of the second median filter). The output data of the second median filter are the sub-matrix UDB" that is erected in the data field OUTB. At the end of the second median filter, the sub matrix UDB" is then copied from the data field OUTB into the matrix UDB' in the data field UDB. After this back-copying, the matrix UDB is completely constructed. The angle clipping can now begin. The angle-clipped difference image pixels are not deposited as a data field in the memory DAT; instead, the resultant image generation of step E is accomplished immediately step-by-step.

The following sequence is to be followed:

Step A is completely processed before step B begins. The processor PROC can already begin the calculations of the data fields MDX, MDY and MWIAU during the execution of step A.

Step B is completely processed before step C begins.

Step C is completely processed before step D begins.

Step D and E ensue step-by-step in succession for each pixel.

Figure 3:
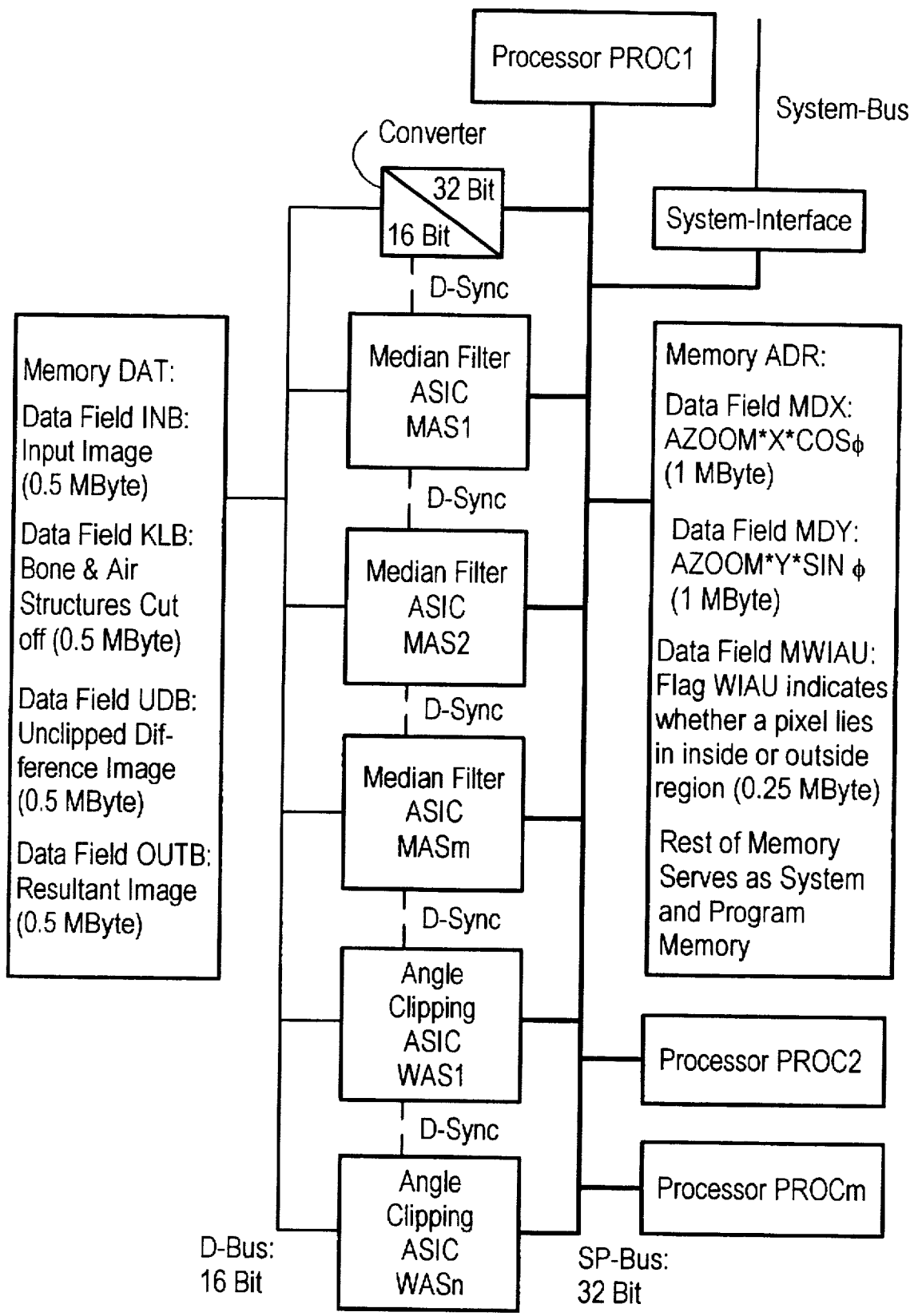

Insofar as the buses D and SP are not fully utilized by one median filter ASIC MAS and one angle clipping ASIC WAS, a number of median filter ASICs MAS1, MAS2, . . . . MASm, or a number of angle clipping ASICs WAS1, WAS2, . . . , WASn can be utilized parallel in order to accelerate the processing. Since the processing capacity of the median filter ASIC is adapted to the processing capacity of the processor PROC, exactly the same number of processors PROC1, PROC2, . . . , PROCm as median filter ASICs are employed. The processing in the median filter is divided pixel-by-pixel onto a number of median filter ASICs in this case, or the processing of the angular clipping is divided onto a number of angle clipping ASICs. This is shown for the case m=3 and n=2 in FIG. 3.

Insofar as a number of ASICs MAS or a number of ASICs WAS are utilized parallel, the ASICs access the memory DAT in competition with one another. A predictive access arbitration D-SyNC on the bus D is necessary here that avoids arbitration loses when accessing the memory DAT. The predictive access logic is integrated into the ASICs MAS and WAS. The arbitration between the ASICs MAS among one another, or among the ASICs WAS, already occurs predictively a few clocks before the access time. Since the ASICs MAS, or the ASICs WAS have the same processing capacity compared to one another, the arbitration is already reached a steady state after a few accesses, and no arbitration loses whatsoever occur. The processing on the ASICs then sequences meshed correspondingly such that the ASICs MAS, or the ASICs MAS no longer impede one another.

The number of ASICs MAS and WAS can be increased up to the complete capacity of the buses D and SP for achieving the optimum performance of the arithmetic unit for the adaptive filter. When one of the buses D or SP is fully loaded, a larger number of ASICs yields no performance enhancement of the arithmetic unit for the adaptive filter.

Imaging the calculating steps onto the arithmetic unit of the adaptive filter and estimating the processing capacity takes place as follows.

The estimation of the processing capacity should be undertaken in calculating clocks. Zero wait states are assumed (no arbitration) given access on the bus D; one wait state is assumed (one clock arbitration) given access on the bus SP. This is based on an image matrix having MATDIM*MATDIM pixels. Let the value range of a pixel be [0.4095].

Subsequently executed arithmetic unit should be integrated into the ASICs insofar as possible. Insofar as the ASICs do not allow the accommodation of these arithmetic units due to their complexity, these arithmetic units can be appropriately distributed from one ASIC onto a number of ASICs.

Median filter ASIC:

a) One integer comparator (16 bits) for following multiplex logic (for clipping according to calculating step A, or of the threshold evaluation of step E and step C, or limitation of coordinates to image dimension.

b) One integer comparator (16 bits) with following multiplex logic (for median value formation of step B and C)

c) One NINT operator (floating decimal point—>16 bits)

d) One floating decimal point multiplier e) One integer adder (32 bits)

f) One integer multiplier (16 bit input, 32 bit output)

a) Four floating decimal point multipliers: GMUL1, GMUL2, GMUL3, GMUL4.

b) Three floating decimal point adders: GADD1, GADD2, GADD3 c) Two integer comparators (16 bits): COMP1, COMP2
d) One NINT operator: NINT
e) One FLOAT operator: FLOAT
f) Two integer adders (32 bits): IADD1, IADD2
g) One integer multiplier (16 bit input, 32 bit output): IMUL
h) One integer comparator (16 bits) with following multiplex logic (for clipping the pixel values to the final pixel value range)

Calculating Step A: cutting off bones and air

Figure 4:
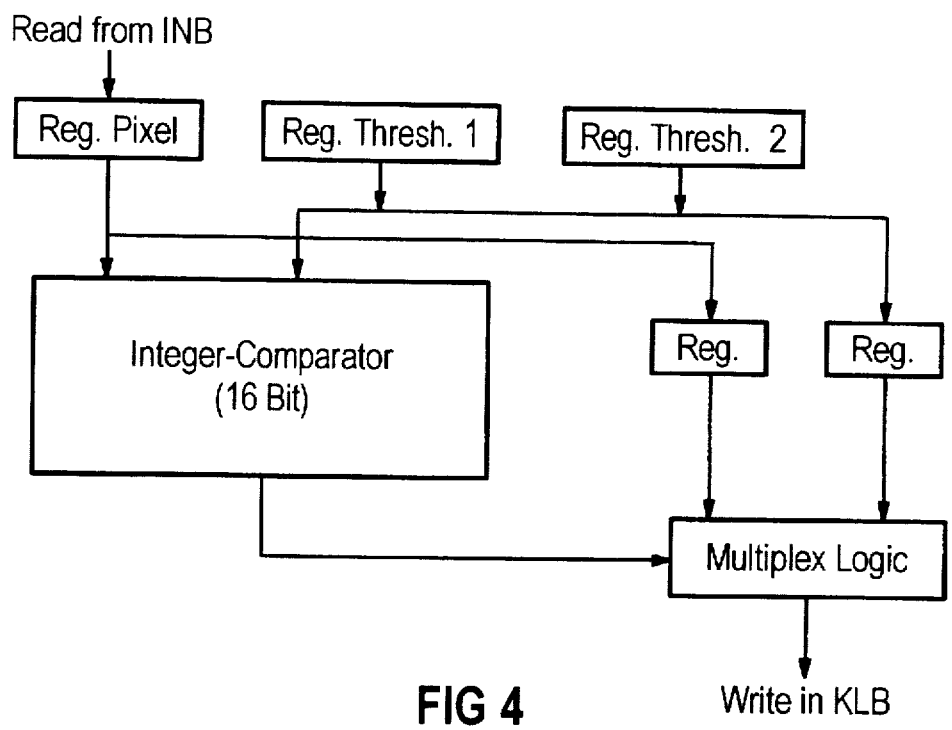

The comparator circuit of FIG. 4 is employed for this purpose. The following steps are necessary for each pixel:

1) Reading a pixel from the matrix INB from the memory DAT (1 clock)
2) Two comparison of the pixel value read in to the limits SWOMOD and SWUMOD, implementation with integer comparator (2 clocks)
3) Multiplex logic controlled by the integer comparator for generating the corresponding output enable for writing the output pixel into the matrix KLB (1 clock)
4) Incrementation of the pixel address (1 clock)
5) Writing the pixel into the matrix KLB in the memory DAT (1 clock).

Given the assumption that steps 3 and 4 and the two accesses on the D-bus can be "hidden" behind the two comparisons of step 2, a processing capacity of two clocks per pixel is achieved.

The calculating step A thus requires 2*MATDIM*MATDIM calculating clocks.

Calculating step B: first median filter

First, the increments for the generation of the supporting value addresses by the processor PROC are defined. The following imaging of the calculating steps onto calculating clocks represents only one example for a realization on a processor. The number of calculating clocks is fundamentally dependent on the performance of the processor PROC employed.

Binder for the following operations: (uv) or (iu, iv) represent coordinate pairs of pixels; middle, rzoom and azoom are image-specific parameters.

The following operations are required per pixel:
1.) 1 clock: u=iu-middle
2.) 1 clock: v=iv-middle
x1=u*rzoom
3.) 1 clock: x=x1+xc
y1=v*rzoom
4.) 1 clock: y=y1+yc
x2=x*x
5.) 1 clock: y2=y*y
6.) 1 clock: r2=x2+Y2
XAZOOM=x*azoom
7.) 13 clocks: 1/R=1/SQRT(r2)
YAZOOM=y*azoom
8.) 1 clock: DX=XAZOOM*1/R
9.) 2 clocks: DY=YAZOOM*1/R
depositing DX in matrix MDX in the memory ADR.
10.) 2 clocks: COMPARE (1/R, 1/IAU)
depositing DY in matrix MDY in the memory ADR.
11.) 1 clock: if 1/R>=1/IAU: WIAU=0
12.) 1 clock: if 1/R<1/IAU: WIAU=1
13.) 2 clocks: increment pixel address, deposit WIAU in data field MWIAU in the memory ADR Processing capacity overall: 28 clocks per pixel.

The calculation of the access address and the addressing of the supporting values for the median value formation are subsequently required. M1 supporting values k={-(M1-1)/2, -(M1-1)/2+1, . . . , 0, (M1-1)/2-1, (M1-1)/2} are addressed for each pixel to be processed.

One supporting value is the pixel to be processed itself (address calculations for this pixel are eliminated).

Figure 5:
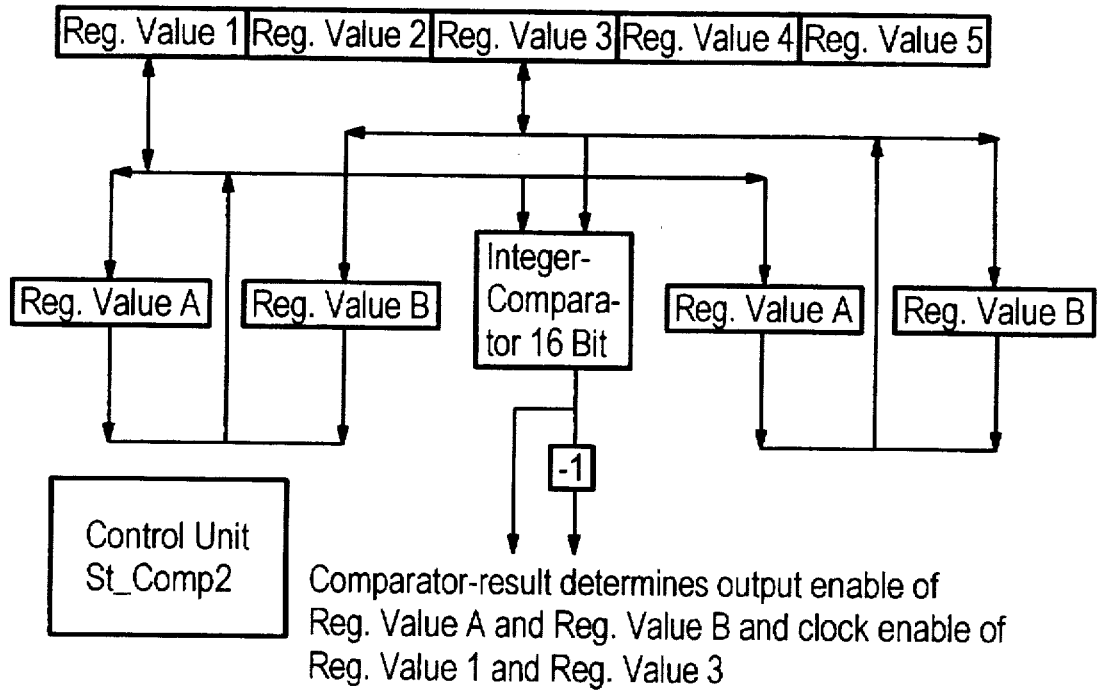

The operations for addressing a supporting value are:
1) Reading DX in via SP bus
2) Reading DY in via SP bus
3) Floating point multiplication: du1=k*DX
4) Floating point multiplication: dv1=k*DY
5) NINT-Operation: idu1=nint (du1)
6) NINT-Operation: idv1=nint (dv1)
7) Integer-Addition: inu1=iu+idu1
8) Integer-Addition: inv1=iv+idv1
9) Clipping-Operation: inu=clipping from inu1 to {0, MAT-DIM-1}
10) Clipping-Operation: inv=clipping from inv1 to {0, MAT-DIM-1}
11) Integer-Multiplication: rel_row_addr= inv*MATDIM
12) 2 Integer-Addition: tap_adr=base_KLB+rel_row_adr+inu
13) Meeting the supporting point value in from matrix KLB via D-bus Operations overall for per pixel (M1 supporting values):
1) 2*M1 accesses onto the SP-bus: 4*M1 clocks
2) M1 accesses onto the D-bus: M1 clocks
3) 2*(M1-1) floating point multiplications: 2*(M1-1) clocks
4) 2*(M1-1) NINT operations: 2*(M1-1) clocks
5) 2*(M1-1) clipping operations (with comparator circuit 1 of, 2 clocks per clipping operation): 4*(M1-1) clocks
6) (M1-1) integer multiplications: (M1-1) clocks
7) 4*(M1-1) integer additions: 4*(M1-1) clocks Given suitable meshing and pipelining, a processing capacity of 5*M1 clocks per pixel is capable of being achieved. The median value from M1 values must be defined for each pixel. (M1-1)+(M1-2)+. . . +2=0.5*M1*(M1-1)-1 comparisons are required for this purpose, these being formed via a comparator circuit 2. FIG. 5 shows the comparator circuit 2 for the case M1=5. The procedure given comparison of two values A and B is as follows: When the value A is greater than the value B, then the values A and B should be exchanged. The exchanging is realized in the comparator circuit 2 by two multiplex iterations that either exchange the values or not dependent on the comparison result. FIG. 5 shows a comparison between the values of Reg. value 1 and Reg. value 3.

Let the identified median value of a pixel be MED [pixel].

Using the comparator circuit 2 of FIG. 5, it is possible to implement a comparison within three clocks. The processing capacity in the median value formation should thus amount to 3*[0.5*M1*(M1-1)-1] clocks.

Each pixel must execute the following operations in the generation of the difference image:

1) Integer subtraction: IDIFF[pixel]=KLB[pixel]-MED [pixel]—>>clock.
2) Clipping-operation: UDB' [pixel=clipping from IDIFF [pixel] to {-SART, SART}—>2 clocks (with comparator circuit 1 of [sic])
3) Writing UDB' [pixel] into memory DAT—>1 clock A processing capacity of 4 clocks per pixel is possible in the generation of the difference image.

Figure 6:
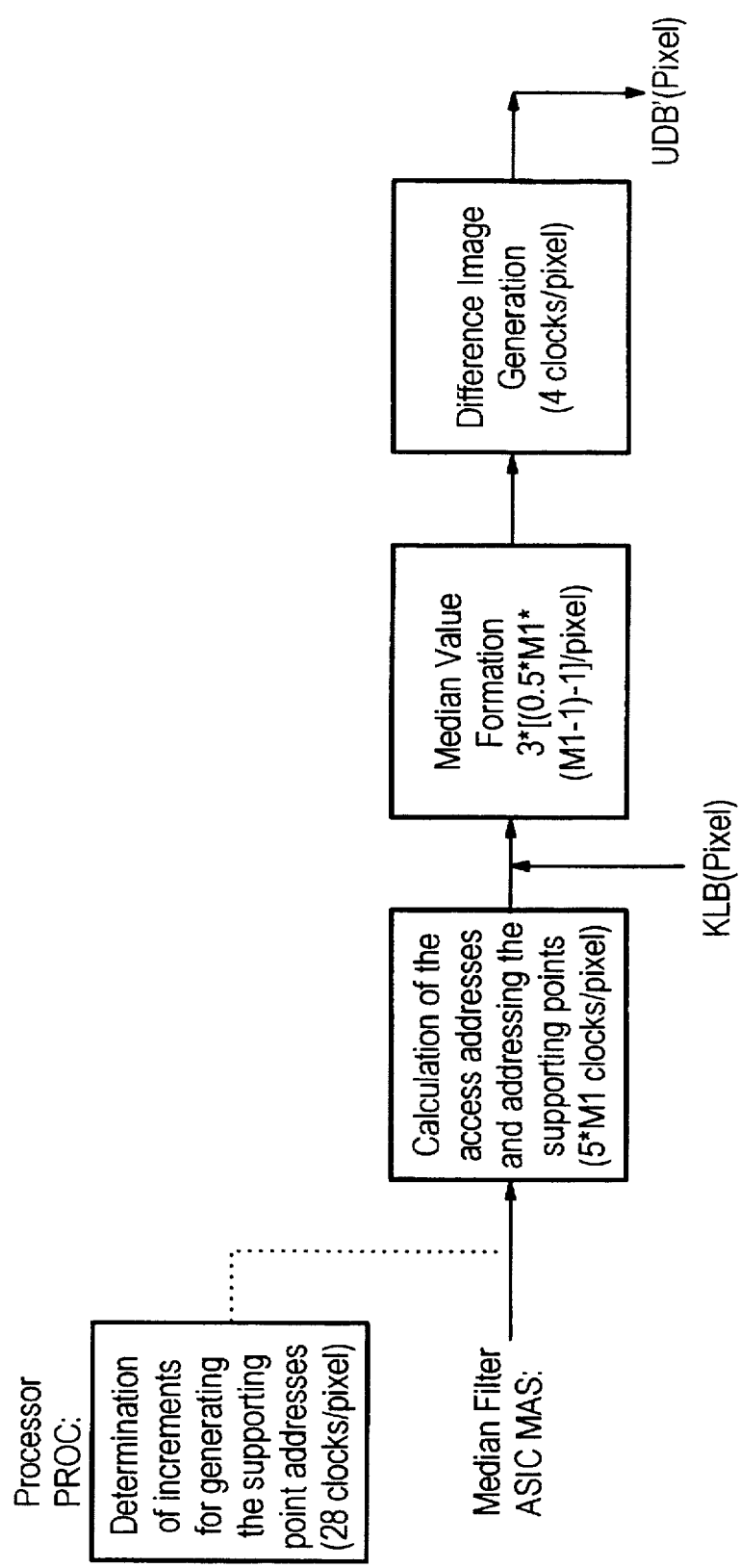

Each pixel must pass through the processing pipeline shown in FIG. 6 in the median filter ASIC MAS. The slowest link of the chain defines the processing capacity of the pipeline. For the case M1=5, the generation of the supporting value address by the processor PROC with the estimated 28 clocks/pixel has approximately the same outlay as the median value formation with 27 clock/pixel. For M1>5, the median value formation represents the greatest outlay.

The calculating step B requires $|0.5*M1*(M1-1)-1|$ $*3*MATDIM*MATDIM$ calculating clocks when the median value formation is the slowest link in the processing pipeline.

Calculating Step C: second median filter

The second median filter is implemented with M2 supporting points. The raster between the supporting points is halved compared to the raster of the first median filter. The increments deposited by the processor PROC for generating the supporting point addresses, consequently, are to be halved.

The second median filter is traversed only in a region close to the center. This region is very small compared to the image matrix.

The input image matrix is the difference between the matrices KLD |pixel| and UDB' |pixel|. The difference is calculated only for the supporting point elements of second median filter to conserve circuit outlay.

The calculations of the second median filter can be implemented as in the first median filter, with slight modifications.

Even given the largest zoom, at most 10% of the calculating outlay of the first median filter would be incurred at the second median filter. The processing capacity at the second median filter in the case of M2<5 is determined by the calculation of the access address of the supporting values and the addressing of the supporting values for the median filtering. The maximum calculating outlay for the second median filter is estimated as follows with the assistance of the presentation of the calculating outlay for the first median filter:

The calculating step requires a maximum of
0.5*M2*MATDIM*MATDIM calculating clocks.

Calculating Step D: angle clipping and
Calculating Step E: resultant image generation First, the coordinates of the pixels are to be defined by the processor PROC with reference to the rotational center.

These calculations ensue with a slight time advance compared to the start of the angle clipping ASIC AS so that the x-coordinates and y-coordinates of a pixel are already available in the processing of the pixel by the angle clipping ASIC.

The data fields MDX and MDY of the median filters are no longer required and can be overwritten. The processor PROC erects the X-coordinates in the data field MDX of the median filters, the y-coordinate in the data field MDY.

The following operations are required per pixel:
1) 1 clock u=iu-middle
2) 1 clock: v=iv-middle
x1=u*rzoom
3) 1 clock: x=x1+xc
y1=v*rzoom
4) 2 clocks: y=y1+yc
depositing x in matrix MDX in the memory ADR
5) 2 clocks: increment pixel address
6) deposit y in matrix MDY in the memory ADR Processing capacity: 7 clocks per pixel.

The data MDX, MDY and MWIAU calculated by the processor PROC are read in from the memory ADR by the angle clipping ASIC WAS via the bus SP.

The pipeline for generation and accumulation of supporting points (referred to below as accumulation pipeline WAKKUS) requires the following arithmetic components in order to be able to accumulate a supporting value within 2 clocks:

4 floating decimal point multipliers: GMUL1, GMUL2, GMUL3, GMUL4

3 floating decimal point adders: GADD1, GADD2, GADD3

2 integer comparators (16 bits): COMP1, COMP2

1 NINT operator: NINT 2 integer adders (32 bits): IADD1, IADD2

1 integer multiplier (16 bit input, 32 bit output): IMUL.

The pipeline WAKKUS is traversed in the generation and accumulation of each supporting value. The plurality of W supporting points must be accumulated in the angle clipping for each pixel.

A new supporting value is generated and accumulated in respectively 2 clocks in the pipeline WAKKUS. A processing capacity of 2 clocks per supporting value to be accumulated is achieved.

Sequence of the operations in the accumulation pipeline WAKKUS for addressing and accumulating a supporting value (each sub-point represents a meshing by one clock or, respectively, one pipeline step):

1) GMUL1: y1=x*a21

GMUL2: y2=y*a22

GMUL3: x1=x*a11

GMUL4: x2=y*a12

The status of the flag WIAU indicates whether a pixel to be processed lies in the inside or outside region. A distinction is made on the basis of WIAU whether the coefficients for the inside or outside region are used for a11, a12, a21 and a22.

2) GADD1: yn=y1+y2

GADD2: xn=x1+x2 x:=xn

Y:=yun—>feed in step 1 for generating the next supporting value.

3) GADD1: y3=yn−yc

GADD2: x3=xn−xc

4) GMUL1: vn=y3*1/rzoom (1/rzoom is an image-specific constant)

GMUL2: un=x3*1/rzoom

5) GADD3: finv=vn+middle (middle is a constant)

6) GADD3: finu=un+middle

NINT: inv=nint (finv)

7) COMP1: inv<0?

NINT: inu=nint (finu)

8) COMP1: inv>MATDIM-1?

COMP2: inu<0?

9) IMUL: izei=inv*MATDIM

COMP2: inu>MATDIM-1?

10) IADD1: sadr=izei+inu

11) Read access onto data field UDB with relative address sadr yields supporting value sval 12) IADD2: accumulation of the supporting values ak=ak+sval.

The following time sequence of the calculating steps for successive pixels arises:

| Time: | 1 | 2 | 3 | 4 | 5 | 6 | 7 | 8 | 9 | 10 | 11 | 12 | 13 |
|---|---|---|---|---|---|---|---|---|---|---|---|---|---|
| Calculating Operations: | | | | | | | | | | | | | |
| Pixel n:1 | | 2 | 3 | 4 | 5 | 6 | 7 | 8 | 9 | 10 | 11 | 12 | |
| Pixel n + 1: | | | 1 | 2 | 3 | 4 | 5 | 6 | 7 | 8 | 9 | 10 | 11 |
| Pixel n + 2: | | | | 1 | 2 | 3 | 4 | 5 | 6 | 7 | 8 | 9 | |
| Pixel n + 3: | | | | | 1 | 2 | 3 | 4 | 5 | 6 | 7 | | |
| Pixel n + 4: | | | | | | | 1 | 2 | 3 | 4 | 5 | | |
| Pixel n + 5: | | | | | | | | | | 1 | 2 | 3 | |

As can be seen, the even-numbered calculating operations and the odd-numbered calculating operations sequence in parallel in alternation in the steady state. This parallel processing is possible with the arithmetic units of the accumulation pipeline WAKKUS. A processing capacity of 2*W clocks per pixel is achieved.

The value ak accumulated from W supporting points is stored as the value akend for the result image generation and the value ak is reset for the processing of a new pixel.

The generation of the result pixel from the value akend proceeds as follows:

1) Reading the pixel to be processed from the matrix INB [pixel] via the D-bus

2) Forming the value akend: diff=akend*1/W by converting akend in float by float operator FLOAT GMUL3: multiplication by the constant 1/W NINT: conversion of the result of the multiplication into integers 3) Difference formation OUTB [pixel]=INB [pixel]–diff 4) Limiting the value range of OUTB [pixel] to the range {0.4095} by an integer comparator with following multiplex logic (see FIG. 4)

5) Writing the result pixel OUTB [pixel] into result matrix via the D-bus.

The operations for generating the result pixel can be "hidden" behind the required 2*W clocks for supporting point accumulation so that while the result image generation is undertaken for the pixel n, one can already begin with the supporting point accumulation for the pixel n+1. The read-in of MDX, MDY and MWIAU via the bus SP from the memory ADR can likewise be hidden behind the supporting point accumulation.

A processing capacity of 2*W clocks per pixel thus arises for the calculating steps D (angle clipping) and E (result image generation).

The calculating steps D and E thus require 2*W*MATDIM*MATDIM calculating clocks.

Estimates of the processing capacity of the overall system:

Given the minimum expansion level indicated in FIG. 2 with one processor PROC, one median filter ASIC MAS and one angle clipping ASIC WAS, the following processing capacity is derived in terms of calculating clocks:

Calculating Step A: 2*MATDIM*MATDIM

Calculating Step B: |0.5*M1*(M1-1)-1| *3*MATDIM*MATDIM

Calculating Step C: maximum 0.5*M2*MATDIM*MATDIM

Calculating Step D and E: 2*W*MATDIM*MATDIM

Total for calculating steps A–E, {2*(W+1)+3*[0.5*m1* (M1-1)-1]+0.5*M2}*MATDIM*MATDIM Added thereto is the time for the data delivery of input and resultant image.

Insofar as the buses D and SP are not fully utilized by one median filter ASIC MAS and one angle clipping ASIC WAS, a number of median filter ASICs MAS1, MAS2, . . . , MASm, or a number of angle clipping ASICs WAS1, WAS2, . . . , WASn can be utilized in parallel to in order to accelerate the processing. Since the processing capacity of the median filter ASIC is matched to the processing capacity of the processor PROC, exactly the same number of processors PROC1, PROC2, . . . , PROCm as median filter ASICs are employed. The maximum processing capacity is then determined by the access onto the buses D and SP:

1) Access per pixel in calculating step A:

a) 1 access to the D-bus for reading the pixel in from the matrix INB (1 clock)

b) 1 access on the D-bus for writing the pixel into the matrix KLB (1 clock)

Number of access clocks in calculating step on the bus D: 2*MATDIM*MATDIM

Number of access clocks in calculating step A on the bus SP: none.

2) Access per pixel in calculating step B:

a) M1 access on the D-bus for reading the supporting points in from the matrix KLB (a total of M1 clocks)

b) 1 access on the D-bus for writing the pixel into the matrix UDB (1 clock)

c) 3 access on the SP bus for depositing MDX [pixel] MDY [pixel] and MWIAU [pixel] from the processors (total of 6 clocks)

d) 2 access to the SP bus for reading MDX [pixel] and MDY [pixel] from the median filter ASIC (total of 4 clocks).

Number of access clocks in calculating step B to the bus D: (M1+1)*MATDIM*MATDIM Number of access clocks to bus SP in calculating step B: 10*MATDIM*MATDIM It should be noted that 2*MATDIM*MATDIM access clocks can already be actuated during the calculating step A. When the calculation of MDX, MDY and MWIAU is already begun at the beginning of the calculating step A. Thus, only 8*MATDIM*MATDIM access clocks to the bus SP remain after the start of the medium filter ASIC.

3) Access per pixel to be considered in calculating step C:

a) 2*M2 access to the d bus for reading the supporting points in from the matrix KLB and UDB' (total of 2*M2 clocks)k b) 1 access to the d bus for writing the pixel into the matrix UDB" (1 clock)

c) 2 accesses to the d-bus for back-copying the matrix UDB** into the matrix UDB (total of 2 clocks)

d) 2 accesses to the SP-bus for reading MDX [pixel] and MDY [pixel] in from the median filter ASIC (total of 4 clocks).

Number of access clocks to the bus D in calculating Step C: 0.1*(2*M2+3)*.MATDIM*MATDIM Number of access clocks to the bus SP in calculating Step C: 0.4*MATDIM*MATDIM 4) Access per pixel to be considered in the calculating steps D and E:
   a) W accesses to the D-bus for reading the supporting points in from the matrix UDB (W clocks).
   b) 1 access to the D-bus for reading the input image pixel in from the matrix INB (1 clock)
   c) 1 access to the D-bus for writing the result pixel into the matrix OUTB (1 clock)
   d) 2 accesses to the SP-bus for depositing MDX |pixel| and MDY |pixel| from the processor (total of 4 clocks)
   e) 3 accesses to the SP-bus for reading MDX |pixel|, MDY |pixel| and MWIAU |pixel| from the angle clipping ASIC (total of 6 clocks)

Number of access clocks to the bus D in the calculating Steps D and E: (W+2)*MATDIM*MATDIM.

Number of access clocks to the bus SP in the calculating Steps D and E: 10*MATDIM*MATDIM.

The greatest possible processing capacity thereby is achieved due to the access clocks to the bus that is most heavily loaded (in terms of access clocks):

Calculating Step A: 2*MATDIM*MATDIM
Calculating Step B: 8*MATDIM*MATDIM (for M1<=7)
Calculating Step C: max. 0.1*(2*M2+3)*MATDIM*MATDIM
Calculating Steps D and E: (W+2)*MATDIM*MATDIM (for W>=8)
Total for calculating Steps A through E: [W+12+0.1*(2*M2+3)]*MAT-DIM*MATDIM Although modifications and changes may be suggested by those skilled in the art, it is the intention of the inventors to embody within the patent warranted hereon all changes and modifications as reasonably and properly come within the scope of their contribution to the art.

I claim as my invention:

1. An arithmetic unit for a computed tomography apparatus comprising:

a processor;

at least one median filter means for producing a median filtered difference image;

at least one angle clipping means for producing a resultant image from said median filtered difference image; and at least one memory accessible by said processor, said median filter means and said angle clipping means for artifact reduction in said resultant image, said at least one memory having a maximum access bandwidth which is completely utilized in the artifact reduction.

2. An arithmetic unit as claimed in claim 1 wherein said median filter means comprises an ASIC, and wherein ASIC comprises:

for each pixel, means for determining increments for generating a supporting point address in said memory by said processor;

means for calculating access addresses and for addressing said supporting values from said memory;

means for forming a median value of said supporting points; and means for forming a difference image from said median values.

3. An arithmetic unit as claimed in claim 1 wherein said angle clipping means comprises an ASIC, and wherein said ASIC comprises:

means for determining coordinates of each pixel with reference to a rotational center by said processor;

accumulation pipeline means for generating an accumulating supporting value from said difference image obtained by said median filter means; and means for generating said resultant image from said supporting values from said difference image.

* * * * *